United States Patent
Gelbe et al.

[11] Patent Number: 5,659,591
[45] Date of Patent: Aug. 19, 1997

[54] CONTAINMENT SPRAY SYSTEM FOR A LIGHT-WATER REACTOR

[75] Inventors: Michael Gelbe, Baiersdorf; Heinz-Werner Hartmann, Buckenhof, both of Germany

[73] Assignee: Siemens Aktiengesellschaft, Munich, Germany

[21] Appl. No.: 671,798

[22] Filed: Jun. 24, 1996

Related U.S. Application Data

[63] Continuation of PCT/DE94/01473 Dec. 12, 1994.

[30] Foreign Application Priority Data

Dec. 23, 1993 [DE] Germany ............... 43 44 004.5

[51] Int. Cl.⁶ ................................................. G21C 15/18
[52] U.S. Cl. .......................... 376/298; 376/282; 376/299
[58] Field of Search .................................. 376/282, 283, 376/293, 298, 299; 976/DIG. 142, DIG. 196

[56] References Cited

U.S. PATENT DOCUMENTS

| | | | |
|---|---|---|---|
| 3,865,688 | 2/1975 | Kleimola | 376/283 |
| 3,966,548 | 6/1976 | Müller et al. | 376/283 |
| 4,587,080 | 5/1986 | Johnson | 376/282 |

FOREIGN PATENT DOCUMENTS

| | | |
|---|---|---|
| 0 405 720 | 1/1991 | European Pat. Off. . |
| 2 172 152 | 2/1972 | France . |
| 2 223 791 | 3/1973 | France . |
| 22 07 870 | 8/1979 | Germany . |
| 33 02 773 | 8/1983 | Germany . |
| 60-31092 | 2/1985 | Japan . |
| 2 114 802 | 8/1983 | United Kingdom . |

OTHER PUBLICATIONS

WPI/Derwent, Published Abstract 88–032448 & JP-A-62-291592 (JGC Crop) Dec. 18, 1987.

Primary Examiner—Michael J. Carone
Assistant Examiner—Matthew J. Lattig
Attorney, Agent, or Firm—Herbert L. Lerner; Laurence A. Greenberg

[57] ABSTRACT

A containment spray system for a light-water reactor includes a water trough being disposed in a safety tank. An immersion pump disposed in the vicinity of the bottom of the water trough, a spray branch and an outlet-side spray nozzle array, are connected to the water trough for injecting water into the containment in finely dispersed form in the event of an operational incident.

8 Claims, 3 Drawing Sheets

CONTAINMENT SPRAY SYSTEM FOR A LIGHT-WATER REACTOR

CROSS-REFERENCE TO RELATED APPLICATION

This application is a Continuation of International Application Ser. No. PCT/DE94/01473, filed Dec. 12, 1994.

BACKGROUND OF THE INVENTION

Field of the Invention

The invention relates to a containment spray system for a light-water reactor, having a water trough in a safety tank and having a spray branch, a pump and an outlet-side spray nozzle array, connected to the water trough, for injecting water into the containment in finely dispersed form in the event of an operational incident.

One such containment spray system is known from German Patent DE 22 07 870 C3, corresponding to U.S. Pat. No. 3,966,548. In that system, the water trough communicates with a sump cooler disposed in the containment through supply and drainage lines. Accordingly, not only trough water but water from the sump cooler as well is used for the spraying.

Such containment spray systems have the task of spraying water being aspirated through a pump, in finely dispersed form in the safety tank, in order to allow both the temperature and the pressure in the safety tank to be reduced and also to allow radioactive aerosols, which form inside the safety tank to be bound, in an incident that cannot reach the outside. Containment spray systems like that referred to above, which aspirate the spray water from the sump of the safety tank, cannot spray with the desired fineness because if the return cooling water and emergency core cooling water fed into the primary loop during the incident is returned to it, the sump can contain contaminants or impurities that can stop up the nozzles.

Published Japanese Patent Application 60-31092 describes a spray apparatus for a nuclear reactor with a pressure vessel. The pressure vessel is surrounded by a safety tank in which two water-filled chambers are present below the pressure vessel. The spray apparatus is disposed both on the walls of the safety tank and on a ceiling of the water-filled chamber. The spray apparatus on the safety tank wall is supplied with water from the chamber or from an additional tank located outside the safety tank through a pump, which is disposed in a separate chamber outside the safety tank.

German Published, Non-Prosecuted Patent Application DE 33 02 773 A1, corresponding to U.S. Pat. No. 4,587,080, describes an emergency core cooling system for a pressurized water nuclear reactor plant. The emergency core cooling system has a building spray pump that communicates with a fuel exchange and water storage tank. Through the emergency core cooling system, if an elevated pressure occurs in the reactor building, water is sprayed in through a spray apparatus on the ceiling of the reactor building. The water is pumped to the spray apparatus from an emergency water storage tank located inside the reactor building or a water storage tank located outside the reactor building through a pump, in particular a low-pressure pump. The pump is located in a directly attached structure outside the reactor building.

SUMMARY OF THE INVENTION

It is accordingly an object of the invention to provide a containment spray system for a light-water reactor, which overcomes the hereinafore-mentioned disadvantages of the heretofore-known devices of this general type, which assures highly effective trapping of fission products, suppression of pressure and heat dissipation over long-term operation in the context of overcoming severe incidents and which excels in having substantially smaller spray droplet sizes than with previously known spray systems. The novel spray system is not intended to share a supply of boron water with the nuclear emergency core cooling and aftercooling systems, in order to make it possible to avoid any competing or rival circuits. Another aspect of the stated object is that the containment spray system according to the invention should be disposed entirely inside the containment, except for energy supply devices.

With the foregoing and other objects in view there is provided, in accordance with the invention, in a light-water reactor having a safety tank defining a containment, a containment spray system, comprising a water trough being disposed in the safety tank and having a bottom; and an immersion pump disposed in the vicinity of the bottom of the water trough, a spray branch and an outlet-side spray nozzle array, connected to the water trough for injecting water into the containment in finely dispersed form in the event of an operational incident.

It is characteristic for the invention that except for the electrical energy supply for the spray pump, the novel containment spray system is disposed inside the containment. It includes an immersion pump which is disposed inside a water trough near the bottom, a riser line and the distribution system having the spray nozzles.

In accordance with another feature of the invention, the water trough is a fuel assembly storage trough that during normal operation is not used and is decoupled from a reactor sump circuit and in particular is filled with borated water. The spray medium is the boron water of the fuel assembly trough which contains fuel assemblies only in the fuel assembly changing phase. The boron water surrounds the spray pump.

In accordance with a further feature of the invention, the fuel assembly trough is an inner trough toward the reactor pressure vessel. In accordance with an added feature of the invention, protection against the effects of severe accidents is provided by suitable devices or coverings of the fuel assembly trough, particularly in the region of the surface of the water. Rubble and other contaminants are thus unable to reach the interior of the fuel assembly trough, so that on one hand the spray pump is protected and on the other hand nothing but clear spray medium is available. Accordingly, small bore diameters for the spray nozzles are possible which in turn brings about the desired high effectiveness of the spraying.

In accordance with an additional feature of the invention, the spray system of the invention has a bore diameter of the spray nozzles and a feed pressure of the immersion pump ensuring that the maximum droplet diameter of a spray mist being produced is 100 µm. Preferably, droplet diameters in the range below 100 µm are employed.

The feed pressure in the lower range must be raised in accordance with the nozzle bore diameters. In accordance with a concomitant feature of the invention, for a bore diameter in the range between 0.5 mm and 1 mm, the feed pressure of the immersion pump is between approximately 3 bar and 80 bar and for a bore diameter in the range between 1 mm and 1.5 mm, the feed pressure of the immersion pump is between approximately 6 bar and 80 bar.

The advantages attainable with the invention and/or its features are considered to be above all that:

the novel spray system does not or need not have any water supply shared with the nuclear emergency core cooling and aftercooling systems;

the spray pump is located in the containment;

the spray pump is constructed as an immersion pump;

the spray pump is or may be disposed in the inner fuel assembly trough which is filled with boron water, in such a way that it is secure against the effects of a severe accident;

the spray pump has optimal inflow conditions;

clean boron water is used for the spraying;

minimal-sized spray droplets with a diameter of less than 100 μm are possible; and the supply of boron water of the inner fuel assembly trough is pumped for long periods into the sump of the containment.

Other features which are considered as characteristic for the invention are set forth in the appended claims.

Although the invention is illustrated and described herein as embodied in a containment spray system for a light-water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
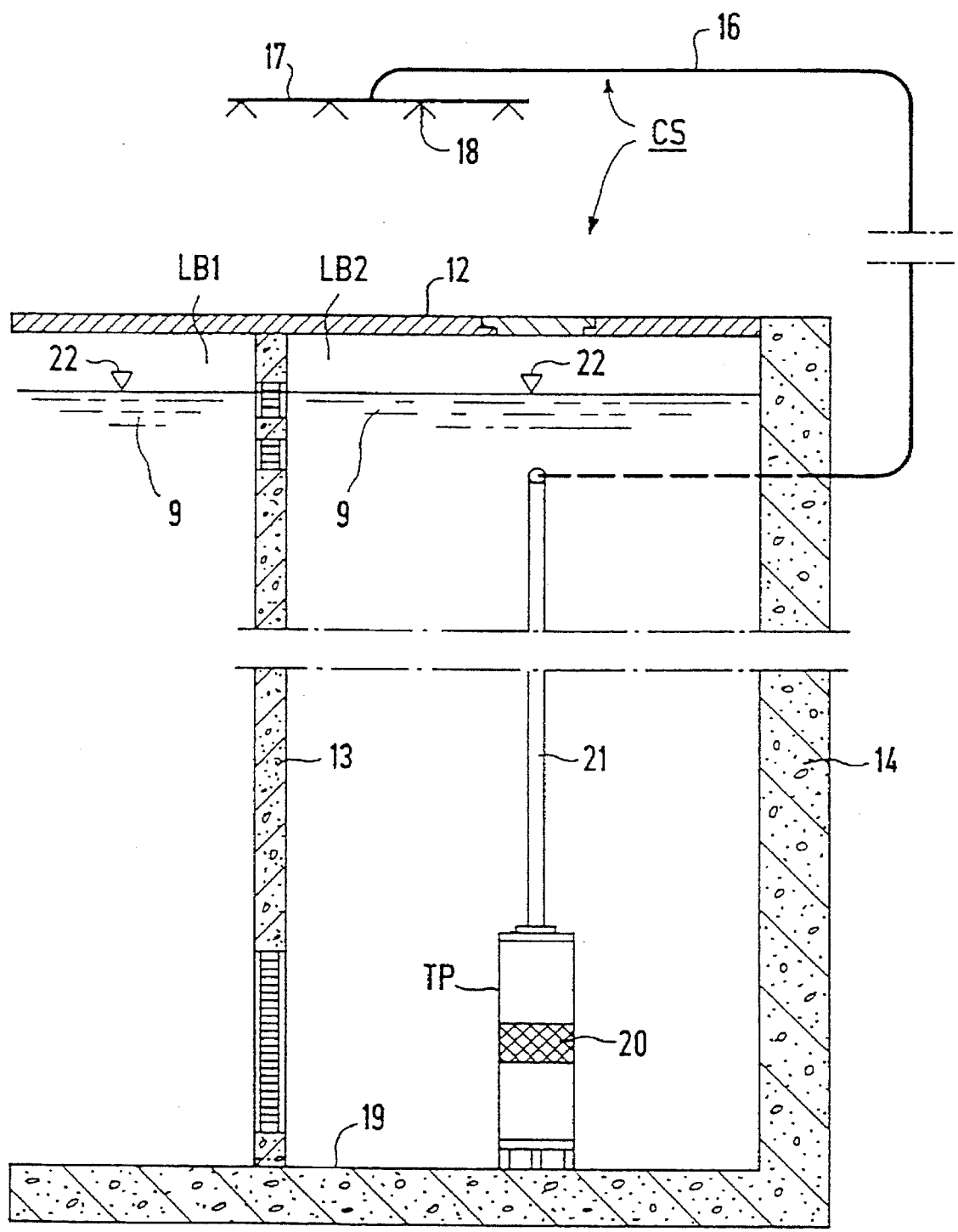
FIG. 1 is a diagrammatic, vertical-sectional view of a containment spray system according to the invention, in which a spray pump constructed as an immersion pump is accommodated in protected fashion in a fuel assembly manipulating trough.
Figure 2:
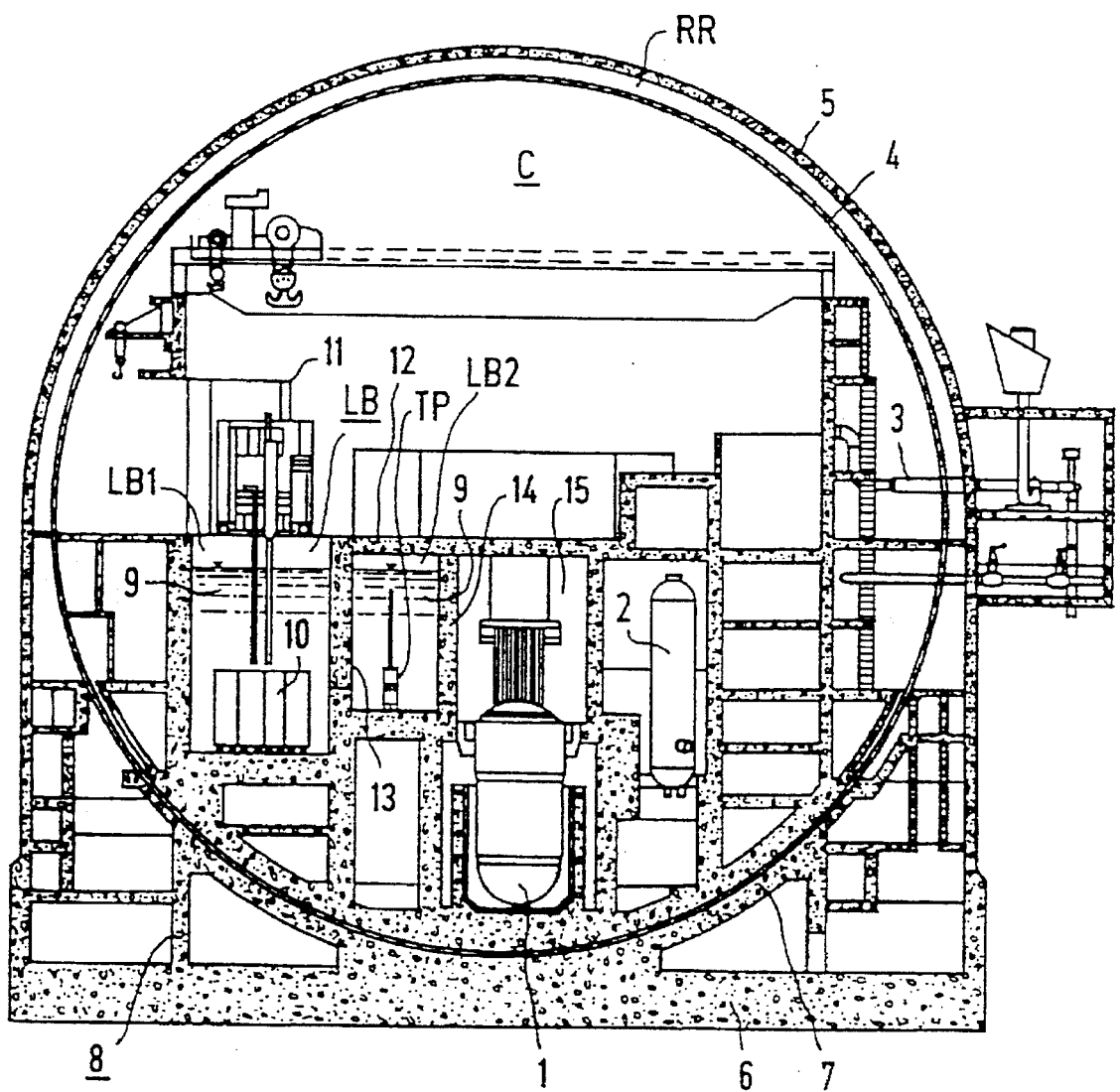
FIG. 2 is a reduced, partly vertical-sectional and partly elevational view of a safety tank of a pressurized water reactor, with an immersion pump of FIG. 1 shown inside its inner fuel assembly manipulation trough.

Referring now in detail to the figures of the drawings, which are sometimes simplified, and first, particularly, to FIG. 2 thereof, there is seen a longitudinal section through a reactor building of a pressurized water reactor in an axis of a fuel assembly storage trough LB, which includes an outer storage trough LB1 and an inner storage trough LB2. A central reactor pressure vessel 1 outputs nuclear heat energy it produces through non-illustrated steam generators, which in turn supply fresh-steam lines 3. Reference numeral 2 indicates a pressure holder through which pressure can be kept constant in the primary system. The reactor pressure vessel 1, the pressure holder 2, the non-illustrated steam generators, an immersion pump TP with the inner storage trough LB2 surrounding it as well as the outer storage trough LB1, are disposed inside a spherical safety tank 4 made of steel which may have a diameter of 56 m, for example. Everything that is located inside of this safety tank 4 is referred to as a containment C. The safety tank 4 is surrounded by a secondary shield 5 of concrete. A concrete foundation 6 acts through a spherical shell 7 to support a lower region of the safety tank 4. An annular chamber RR which is located between the secondary shield 5 and the safety tank 4, is kept at a slight negative pressure for safety reasons (monitoring for tightness, i.e. the absence of leaks). The secondary shield 5, the concrete foundation 6, the spherical shell 7 and other walls shown in FIG. 2 taken together, are referred to as a concrete building or reactor building 8. The outer and inner storage troughs LB1, LB2 are filled with borated water 9 approximately up to the level shown. A compact storage system 10 for fuel assemblies is located in the storage trough LB1, and a fuel assembly changing machine 11 is positioned above the storage trough LB1. In the event of a fuel assembly change, fuel assemblies can be taken out of or inserted into the compact storage system 10 through the use of the fuel assembly changing machine 11. In this process of fuel assembly changing, a covering 12 of the inner storage trough LB2 is partially removed, and the fuel assembly changing machine can be moved crosswise up to a position above the opened reactor pressure vessel 1 with the fuel assembly suspended from the fuel assembly changing machine, through the use of removable protectors (portions of an intermediate wall 13 and a wall 14). A chamber 15 above the reactor pressure vessel 1 is likewise filled with borated water 9. During normal operation of the nuclear reactor plant, the inner trough LB2 serves as a water reservoir for borated water 9, so that in the event of an incident there is sufficient water on hand for a containment spray system CS seen in FIG. 1.

Except for a somewhat different course of the outer wall 14, FIG. 1 shows an enlarged portion of the outer and inner storage troughs LB1, LB2. One can see that the inner storage trough LB2 is a water trough, to which a spray branch 16 with a spray head 17 and spray nozzles 18 is connected, and that the immersion pump TP is a pump which is provided for injecting water into the containment C seen in FIG. 2 in finely dispersed form in the event of an operational incident. In the example shown the immersion pump TP is supported on a bottom 19 of the trough LB2. The immersion pump TP aspirates the water 9 from the trough LB2 through a diagrammatically illustrated filter 20, pumps it through a riser pipe 21 into a remaining portion of the lines in the spray branch 16, which are represented partially in suggested fashion by dashed lines, and from there through the nozzles 18 of the spray head 17 or spray nozzle array into the containment C in the finely dispersed form of a spray mist. Since both troughs LB1 and LB2 are virtually completely filled with borated water 9, as is indicated by a water surface 22, adequate spray water is available in the event that emergency cooling is needed. Up to a certain extent, the water 9 of the outer storage trough LB1 can also be utilized for spray purposes. In other words, the fuel assembly storage system 10 must remain covered with trough water. The sprayed trough water, which serves the purpose of aerosol formation, cooling of the containment, and pressure reduction, condenses for the most part and passes from the walls of the containment for the most part into a reactor sump (not shown in FIG. 2) and can still be used as sump water for emergency cooling and aftercooling purposes. However, in that case it is no longer used for spraying.

The water reservoir of the inner storage trough LB2 can be replenished if needed through the use of a non-illustrated supply trough located at a higher level, so that long-lasting spray operation can be maintained.

Figure 3:
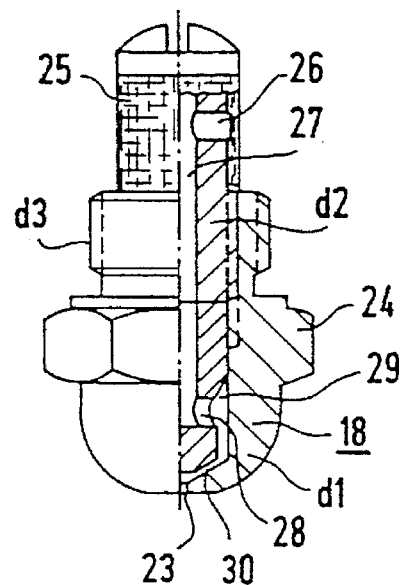
FIG. 3 is a partly elevational and partly longitudinal-sectional view of a spray nozzle.

A so-called centrifugal mist nozzle shown in FIG. 3 serves the purpose of fine atomization of liquids, in the present case borated water. It may be ordered as Model 121 from the company Schlick-Düsen, AlexandrinenstraBe 9, D-96450 Coburg, Germany. It is a three-part nozzle, including a nozzle head d1, a swirl insert d2 and a screw-in part d3 with a male thread. The nozzle head d1 has a nozzle bore 23, is shaped hemispherically and has a hexagon 24. A portion of the swirl insert d2 that protrudes axially outward is surrounded by a hollow-cylindrical screen body 25, by way of which the pressurized water can enter radial channels 26 and from there can enter an axial channel 27. Channels 28 discharging on an innermost end of the swirl insert from the axial channel 27 into an annular chamber 29 are shaped in such a way that a rotating ring of water develops in the annular chamber 29, which communicates through a gap 30 with the nozzle bore 23. In this way, the water that is under pressure is atomized into superfine droplets with a large specific surface area. The water is supplied under pressure to the nozzle 18 and passes through the chamber or tangential slits 29 into the gap or circulating chamber 30. In this case, pressure energy is converted into rotational or motion energy. A rotating film of liquid forms around an air core and emerges in the form of a hollow-conical stream through the orifice bore 23 and breaks apart into many small droplets, after surface tension has been overcome. The quality of atomization and the droplet range are dependent on a bore diameter D, the magnitude of the atomization pressure, the scattering cone, the viscosity, the surface tension and the density. A suitable plurality of the nozzles 18 of FIG. 3 are screwed by their screw-in parts d3 into a nozzle head of the kind that can be diagrammatically seen in FIG. 1.

Figure 4:
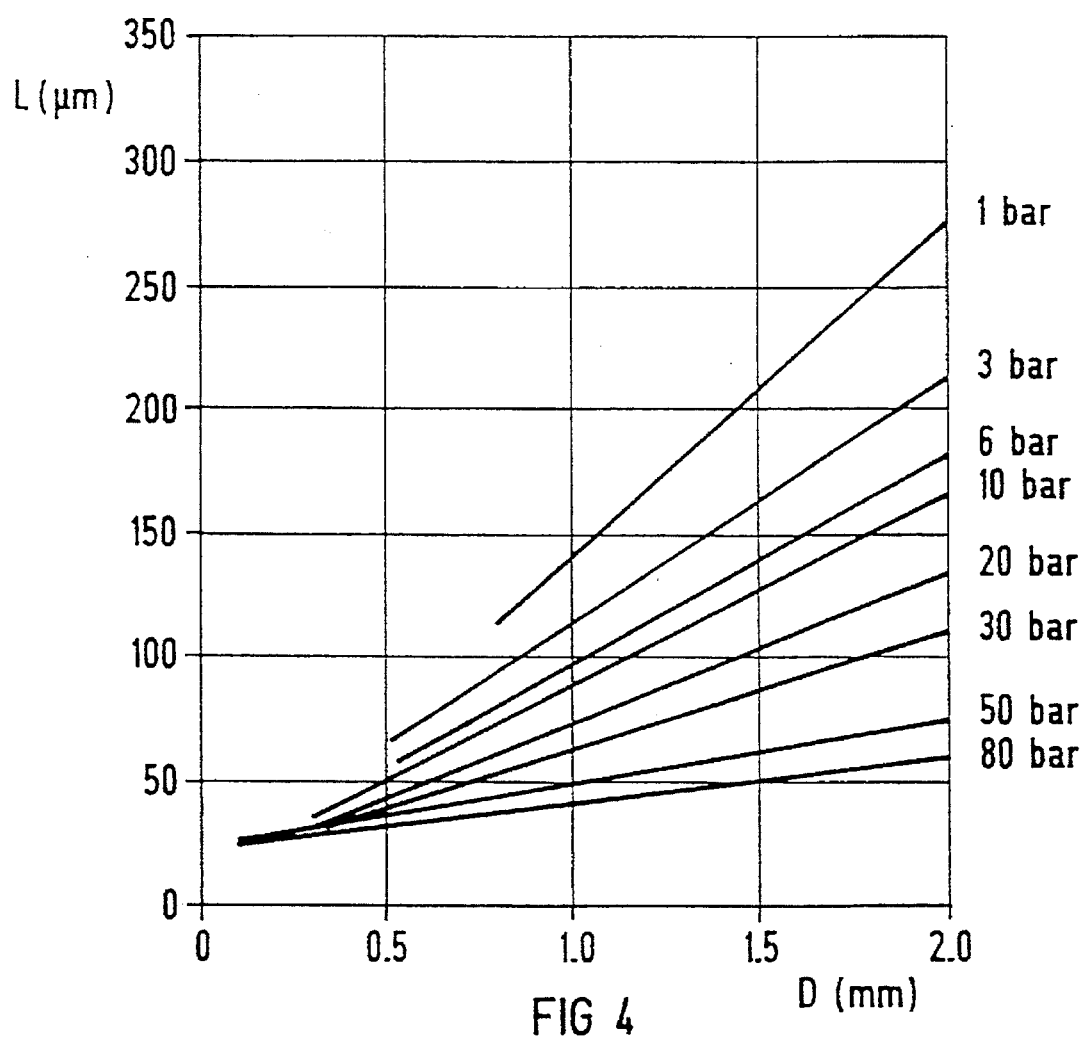
FIG. 4 is a diagram showing a family of nozzle characteristic curves, in which droplet size is plotted in micrometers (on the ordinate) over bore diameter in millimeters (on the abscissa) with pump feed pressure as the parameter, specifically for a so-called centrifugal nozzle of the kind known shown in FIG. 3.

FIG. 4 shows a family of characteristic curves for the Model 121-type nozzle shown in FIG. 3. The curves represented by solid lines are preferred operating states and those shown as dashed lines represent further possible operating states. It can be seen that as the bore diameter D which is shown in millimeters increases, the feed pressure of the pump must Likewise become greater, so that a preferred droplet size L of less than or equal to 100 µm can be achieved. Thus for a nozzle bore diameter in the range between 0.5 mm and 1 mm, the feed pressure of the pump is between about 3 bar and 80 bar. By comparison, in the case of a nozzle bore diameter D that is larger and in the range between 1 mm and 1.5 mm, the feed pressure of the pump is preferably between about 6 bar and 80 bar. At 50 bar and a bore diameter of 1 mm, very fine drops are obtained with a droplet size of approximately 50 µm. Examples of possible materials for the nozzle 18 are brass, acid-proof special steel, heat-resistant special steel, titanium and tantalum.

We claim:

1. In a light-water reactor having a safety tank defining a containment, a containment spray system, comprising:

a water trough being disposed in the safety tank and having a bottom; and an immersion pump disposed in the vicinity of said bottom of said water trough, a spray branch and an outlet-side spray nozzle array, connected to said water trough for injecting water into the containment in finely dispersed form in the event of an operational incident.

2. The containment spray system according to claim 1, wherein said water trough is a fuel assembly storage trough being unused and decoupled from a reactor sump circuit during normal operation.

3. The containment spray system according to claim 2, wherein said fuel assembly storage trough is filled with borated water.

4. The containment spray system according to claim 2, wherein said fuel assembly storage trough is an inner storage trough disposed toward a reactor pressure vessel.

5. The containment spray system according to claim 2, wherein said fuel assembly storage trough has a cover forming a protection against rubble.

6. The containment spray system according to claim 1, wherein said spray nozzles have a bore diameter and said immersion pump has a feed pressure, being adjusted for producing a maximum droplet diameter of 100 µm in a spray mist.

7. The containment spray system according to claim 6, wherein said bore diameter is in a range between 0.5 mm and 1 mm and said feed pressure of said immersion pump is between approximately 3 bar and 80 bar.

8. The containment spray system according to claim 6, wherein said bore diameter is in a range between 1 mm and 1.5 mm and said feed pressure of said immersion pump is between approximately 6 bar and 80 bar.

* * * * *